United States Patent
Gunasekara et al.

(10) Patent No.: US 10,299,131 B2
(45) Date of Patent: *May 21, 2019

(54) WIRELESS GATEWAY, NETWORK ACCESS, AND MANAGEMENT

(71) Applicant: Time Warner Cable Enterprises LLC, St. Louis, MO (US)

(72) Inventors: Don Gunasekara, Reston, VA (US); Kiran R. Yeddala, Ashburn, VA (US); Ahmed Bencheikh, Fairfax Station, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/621,216

(22) Filed: Jun. 13, 2017

(65) Prior Publication Data
US 2017/0289122 A1    Oct. 5, 2017

Related U.S. Application Data

(63) Continuation of application No. 14/164,775, filed on Jan. 27, 2014, now Pat. No. 9,693,231.

(51) Int. Cl.
*H04W 12/08* (2009.01)
*H04L 29/06* (2006.01)
(Continued)

(52) U.S. Cl.
CPC ........... *H04W 12/08* (2013.01); *H04L 63/102* (2013.01); *H04W 28/0205* (2013.01);
(Continued)

(58) Field of Classification Search
CPC ..... H04W 12/06; H04W 84/12; H04W 12/08; H04W 12/04; H04W 8/18; H04W 4/001;
(Continued)

(56) References Cited

U.S. PATENT DOCUMENTS 7,441,043 B1    10/2008  Henry
7,587,512 B2    9/2009   Ta
(Continued)

OTHER PUBLICATIONS

"How to set up public Wi-Fi at your business" by Eric Geier, dated Mar. 27, 2013.*

*Primary Examiner* — Daniel Lai
(74) *Attorney, Agent, or Firm* — Armis IP Law, LLC

(57) ABSTRACT

A wireless gateway controls access through a communication portal to a shared communication link. By way of non-limiting example, the wireless gateway receives input (such as a passcode) from a user operating a communication device in a subscriber domain. The user provides the input to communicate through the communication portal or wireless gateway over the shared communication link. The wireless gateway maps the received input to corresponding access profile information stored in a repository of the wireless gateway hardware. The wireless gateway then provides the communication device access to a remote network over the shared communication link through the communication portal in a manner as specified by the corresponding access profile information.

26 Claims, 7 Drawing Sheets

(51) Int. Cl.
*H04W 28/02* (2009.01)
*H04W 12/06* (2009.01)
*H04W 4/24* (2018.01)

(52) U.S. Cl.
CPC ............... *H04L 63/08* (2013.01); *H04W 4/24* (2013.01); *H04W 12/06* (2013.01)

(58) Field of Classification Search
CPC ... H04W 60/00; H04W 28/0205; H04W 4/24; H04W 4/021; H04W 28/0268; H04W 76/10; H04W 84/045; H04W 4/80; H04W 24/02; H04W 48/16; H04W 8/02; H04W 48/20; H04W 4/50; H04W 60/04; H04W 76/11; H04W 88/16; H04W 48/02; H04W 4/00; H04W 48/08; H04W 76/12; H04W 88/08; H04W 28/20; H04W 72/0453; H04W 72/1226; H04W 72/1278; H04W 8/20; H04W 16/20; H04W 40/248; H04W 4/08; H04W 60/02; H04W 8/12; H04L 67/306; H04L 63/08; H04L 67/22; H04L 63/083; H04L 63/0876; H04L 63/102; H04L 63/06; H04L 12/2856; H04L 63/062; H04L 2012/2841; H04L 63/101; H04L 63/108; H04L 67/025; H04L 63/0807; H04L 63/0892; H04L 63/10; H04L 9/085; H04L 63/0492; G06F 21/44; G06F 21/31; G06F 21/35
See application file for complete search history.

(56) References Cited

U.S. PATENT DOCUMENTS

| | | |
|---|---|---|
| 8,782,741 B1 | 7/2014 | L'Heureux |
| 2002/0124188 A1 | 9/2002 | Sherman |
| 2004/0177276 A1 | 9/2004 | MacKinnon et al. |
| 2004/0181602 A1* | 9/2004 | Fink ........................ H04L 63/10 709/229 |
| 2004/0235455 A1 | 11/2004 | Jiang |
| 2008/0244724 A1* | 10/2008 | Choe ........................ G06F 21/33 726/12 |
| 2008/0288423 A1* | 11/2008 | Eastman ............. G06Q 30/0283 705/418 |
| 2009/0298470 A1 | 12/2009 | Huber et al. |
| 2010/0169475 A1 | 7/2010 | Woundy |
| 2011/0093913 A1 | 4/2011 | Wohlert et al. |
| 2012/0282921 A1* | 11/2012 | Motola .................... H04W 4/14 455/426.1 |
| 2013/0058274 A1* | 3/2013 | Scherzer ............... H04L 63/107 370/328 |
| 2013/0067081 A1 | 3/2013 | Liu |
| 2013/0269008 A1* | 10/2013 | Sheu ..................... H04W 12/04 726/6 |
| 2014/0229604 A1 | 8/2014 | Pfeffer |
| 2015/0071181 A1* | 3/2015 | Nasir .................... H04W 28/20 370/329 |
| 2015/0109909 A1 | 4/2015 | Yeddala |
| 2015/0223059 A1 | 8/2015 | Canpolat |

* cited by examiner

WIRELESS GATEWAY, NETWORK ACCESS, AND MANAGEMENT

RELATED APPLICATIONS

This application is a continuation of earlier filed U.S. patent application Ser. No. 14/164,775 entitled "WIRELESS GATEWAY, NETWORK ACCESS, AND MANAGEMENT," filed on Jan. 27, 2014, the entire teachings of which are incorporated herein by this reference.

BACKGROUND

In general, conventional techniques exist to provide computer users network access. For example, a retail business environment such as a coffee shop can provide free WiFi™ access to its customers. In general, to use the free WiFi™ access provided by a retailer, users operate their respective communication devices to learn of available one or more WiFi™ access points in the area. The customers then select a corresponding WiFi™ access point with which to establish a wireless communication link. While in the domain operated by the retailer, and via communications through the selected WiFi™ access point over the established wireless communication link, a respective communication device is able to retrieve and transmit data to a remote network such as the Internet.

In certain instances, WiFi™ network access is contingent upon purchase of services as opposed to being free in a particular area. For example, an organization such as a hotel may provide WiFi™ access as a perk to its customers. In a similar manner as discussed above, a respective computer user in the hotel can select a corresponding WiFi™ access point in which to establish a corresponding wireless connection. However, to use the WiFi™ access point provided by the hotel, the organization (hotel) typically requires that the computer user provide information such as special passcode, password, etc., (as provided at hotel check-in) prior to granting a user access to the WiFi™ access point. This authentication of users in the hotel environment restricts use of the hotel's WiFi™ access point to hotel customers and prevents inhabitants in nearby buildings or public areas from using the hotel's WiFi™ services.

Typically, a cable network service provider owns and operates a corresponding hardwired communication link between the hotel's WiFi™ access point and the Internet. In many instances, the hotel pays a fee to the cable network service provider for use of data services over the hardwired communication link. The service provider may even provide the hardware and corresponding software to implement the WiFi™ access point at the hotel.

BRIEF DESCRIPTION OF EMBODIMENTS

Conventional techniques of providing wireless access to a network such as the Internet suffer from deficiencies. For example, as discussed above, use of a wireless access point to access the Internet may require some amount of authentication prior to use. Conventional techniques of enabling business owners to provide wireless access services to retail customers are limited to web-based authentication, which means that the WiFi™ access point must communicate with multiple remotely and disparately located servers in order to verify that a corresponding user should be allowed use of a business owner's WiFi™ access point and services. In other words, according to conventional techniques, when a customer of the hotel attempts to use the corresponding WiFi™ access point, the WiFi™ access point must communicate with multiple remotely located servers in order to verify that a given user should be allowed use of the WiFi™ access point. This reliance on use of one or more remote functions (such as authentication, accounting, etc.) as provided by a respective service provider via multiple remotely located servers (with respect to a WiFi™ access point in the hotel) renders it difficult if not impossible for the hotel organization to control wireless access or have knowledge of respective end-users.

Embodiments herein deviate with respect to conventional techniques. For example, in one embodiment, a wireless gateway supplied by a service provider enables an organization to more efficiently control provisioning of data services to users in a network environment. Note that the wireless gateway and any related functionality as described herein can be or include hardware, software, or a combination of hardware and software to carry execution.

More specifically, by way of non-limiting example, an organization such as a business or homeowner can pay a fee to a service provider for use of a wireless gateway and data services over a cable network. In one embodiment, the wireless gateway couples to a shared communication link (as operated and maintained by the service provider) via a communication portal. In addition to including a communication portal, the wireless gateway can include an RF interface supporting wireless communications with one or more communication devices in a network environment.

During operation, the wireless gateway facilitates connectivity between the one or more communication devices and the shared communication link. In other words, one or more communication devices can establish wireless connectivity with the wireless gateway. The wireless gateway transmits upstream communications from the one or more communication devices through the communication portal upstream on the shared communication link. In an opposite direction, the wireless gateway receives downstream communications directed to the communication devices from one or more remote resources over the shared communication link through the communication portal. The wireless gateway forwards the downstream communications received through the communication portal to corresponding one or more communication devices in a subscriber domain.

As an example of operation, assume that the wireless gateway receives input from a user operating a respective communication device in a network environment. In one embodiment, the user provides the input to communicate through the portal over the shared communication link. The input can be any suitable value such as a unique identifier value (password, PIN, etc.) indicating that the user of the communication device has been granted the authority to use the wireless gateway to communicate over shared communication link with a remote network such as the Internet. The user of the communication device receives unique identifier value from the organization managing the wireless gateway at a time such as checking into a hotel, purchase of a product, etc.

In furtherance of providing access to a remote network such as the Internet, the wireless gateway maps the received input (unique identifier value such as a password, PIN, passcode, etc.) to corresponding access profile information stored in a local repository of the wireless gateway hardware. The corresponding access profile information can be configured to indicate any suitable data flow control parameters to be used to control the flow of data through the wireless gateway on behalf of respective one or more users.

By way of non-limiting example, the corresponding access profile information can specify data flow control parameters such as a maximum uplink bandwidth at which the user is able to communicate data through the portal to the shared communication link, a maximum downlink bandwidth in which the user is able to receive data through the portal from the shared communication link, the duration in which the corresponding user is able to use the wireless gateway to communicate over the shared communication link, an expiration date of the corresponding access profile information, etc.

In a manner as specified by the corresponding access profile information assigned for use by a particular user, the wireless gateway provides the communication device access to the remote network through the wireless gateway's portal to the shared communication link.

Note that in a similar manner as discussed above, an organization can operate the wireless gateway to provide different levels of connectivity to users in a network environment. For example, the network administrator of the organization can produce different access profile information such that different users are provided different levels of access to the remote network through the shared communication link.

In contrast to conventional techniques in which functionality such as authentication control information is stored at multiple disparate and remote locations in a respective network environment, a network administrator can produce and initiate storage of corresponding access profile information in a local repository of the wireless gateway.

In accordance with yet further embodiments, when controlling a flow of communications through the portal of the wireless gateway to a shared communication link managed by the service provider, a flow control manager in the wireless gateway can be configured to obtain usage information associated with a respective communication device requesting access to the shared communication link.

In one embodiment, the usage information tracks a past history of the communication device accessing the Internet using the wireless gateway to communicate through the portal to the shared communication link. The flow control manager restricts a flow of data from the communication device through the portal to the shared communication link based at least in part on the obtained usage information and/or the corresponding access control information assigned for use by the user or communication device.

Note that a corresponding service provider that supplies the wireless gateway to a corresponding organization may retain some amount of controlling usage of the shared communication link. For example, in one embodiment, the wireless gateway can be configured to receive flow control management information over a link such as the shared communication link from a service provider that provides or installs the wireless gateway hardware in the subscriber domain. Via the flow control management information, the service provider controls usage of the shared communication link through the portal.

In one embodiment, in accordance with a subscription level purchased by the organization associated with a respective subscriber domain, the flow control management information specifies bandwidth available for use by the wireless gateway hardware to communicate through the portal. As a non-limiting example, the allocated bandwidth may be limited to a total of 200 megabytes per second of data in a downlink direction of the shared communication link through the portal of the wireless gateway.

A corresponding network administrator of the organization and subscriber domain can produce different levels of access profile information such that different groupings of persons in subscriber domain are allocated different amounts of the total available bandwidth. More specifically, via first access profile information, the network administrator of the organization can allocate up to 10 megabytes per second of downlink bandwidth for each person in a first group; via second access profile information, the network administrator of the organization can allocate up to 20 megabytes per second of downlink bandwidth for each person in a second group; and so on.

At any time, an aggregate of users are limited to a downstream bandwidth of 200 megabytes per second. Thus, both the service provider and a corresponding subscriber (such as an organization) jointly control use of a wireless gateway to provide these services to users.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiment includes a computer readable storage medium and/or system having instructions stored thereon. The instructions, when executed by computer processor hardware (such as in wireless gateway hardware), cause the computer processor hardware of the system to: receive input from a user operating a communication device, the user providing the input to communicate from the communication device through a portal of the wireless gateway over a shared communication link; map the received input to corresponding access profile information stored in a repository of the wireless gateway hardware; and provide the communication device access to a remote network over the shared communication link through the portal in a manner as specified by the corresponding access profile information.

Note that the ordering of the operations can vary. For example, any of the processing operations as discussed herein can be performed in any suitable order.

Other embodiments of the present disclosure include software programs and/or respective hardware to perform any of the method embodiment operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for implementing a wireless gateway configured to provide different levels of network access to users in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1:
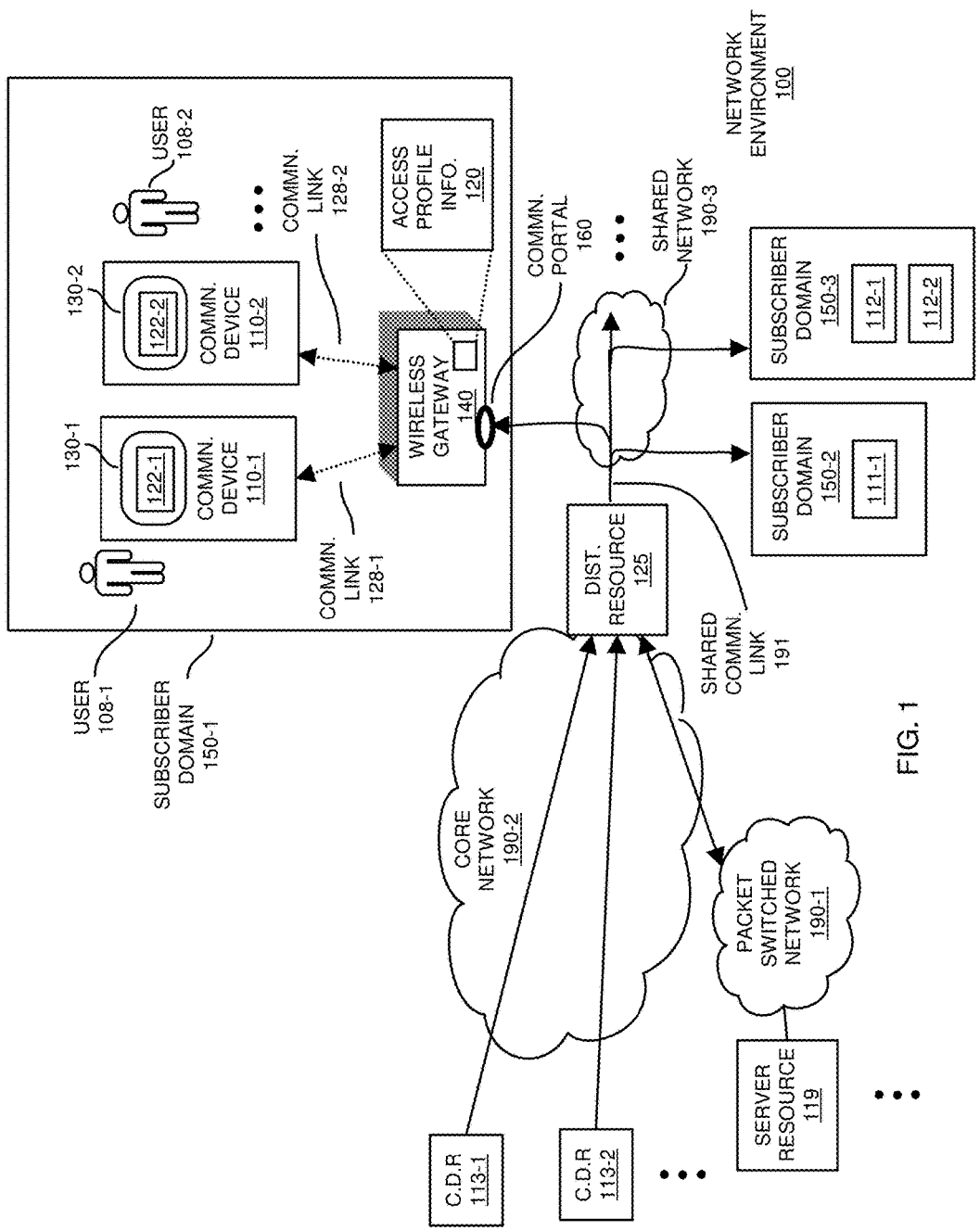
FIG. 1 is an example diagram illustrating network access management in a network environment using a wireless gateway according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

Now, more specifically, FIG. 1 is an example diagram illustrating network access management in a network environment using a wireless gateway according to embodiments herein. The wireless gateway 140 represents hardware and/or software to carry out functionality as discussed herein.

As shown, network environment 100 includes one or more networks 190 such as a packet-switched network 190-1, a core network 190-2, shared network 190-3, etc. Each of the networks 190 can support transmission of digital data such as data packets, MPEG data transport streams, etc. In one embodiment, one or more of networks 190 supports switching of data packets using source and destination address information.

In general, via the different types of networks 190, respective subscribers and corresponding playback devices (such as communication devices 110-1, 110-2, . . . ) in subscriber domains 150 are able to retrieve and playback different types of content such as over-the-top content (such as web pages), scheduled broadcast content, video on-demand content, Internet content, etc.

Note that each of the subscriber domains 150 in network environment 100 can be any suitable type of environment such as a home environment, business environment, etc.

In this example embodiment, subscriber domain 150-1 includes communication device 110-1, communication device 110-2, etc., operated by respective users 108-1, user 108-2, etc.

As further shown, communication device 110-1 includes display screen 130-1 and plays back a rendition of content such as retrieved content 122-1; communication device 110-2 includes display screen 130-2 and plays back a rendition of content such as retrieved content 122-2; and so on.

Subscriber domain 150-1 includes wireless gateway 140 to control access to one or more networks such as packet-switched network 190-1, core network 190-2, in shared network 190-3.

Note that in a similar manner that subscriber domain 150-1 includes wireless gateway 140, each of the other subscribers domains can be configured to include a respective wireless gateway. For example, subscriber domain 150-2 can include a respective wireless gateway to control access by communication device 111-1 to shared communication link 191; subscriber domain 150-3 can include a respective wireless gateway to control access by communication devices 112-1 and 112-2 to shared communication link 191; and so on.

Note that wireless gateway 140 can be any suitable type of resource such as a set-top box, cable modem, WiFi™ access point, server resource, data router, etc. Wireless gateway 140 includes a combination of hardware and software resources to carry out functionality as discussed herein.

If desired, the wireless gateway 140 can be configured as an interconnected mesh network including a master wireless gateway as well as one or more slave wireless gateway resources disposed in subscriber domain 150-1. The mesh network can include any number of slave wireless gateways that communicate with the master wireless gateway to determine whether or not a corresponding user and/or communication device should be allowed access to shared communication link 191. If granted permission from the master wireless gateway, a respective slave wireless gateway resource can provide a corresponding user access to the shared communication link 191 through the respective slave wireless gateway.

As shown in FIG. 1, communication links 128 between the wireless gateway 140 and respective communication devices 110 can be any suitable type of communication medium such as a physical medium, a wireless medium, etc.

During operation, the wireless gateway 140 is an access point controlling network access for each of multiple members in subscriber domain 150-1.

By further way of a non-limiting example, wireless gateway 140 can be a wireless access point such as a WiFi™ base station; communication links 128 can be wireless links between the wireless gateway 140 and the communication devices 110.

For example, communication link 128-1 can be a first wireless communication link supporting communications between wireless gateway 140 and communication device 110-1; communication link 128-2 can be a second wireless communication link supporting communications between wireless gateway 140 and communication device 110-2; and so on.

The wireless gateway 140 can communicate with the communication devices 110 via any suitable protocol or WiFi™ standards such as IEEE (Institute of Electrical and Electronics Engineers) 802.11a, 802.11b, 802.11g, 802.11n, etc.

In an upstream direction, wireless gateway 140 facilitates forwarding of content from communication devices 110 to shared communication link 191.

In a downstream direction, wireless gateway 140 facilitates distribution of content received over shared communication link 191 to the communication devices 110.

Wireless gateway 140 can be configured to support cable modem functionality. Via communications through the wireless gateway 140 and over shared communication link 191 to distribution resource 125 (such as a cable modem termination system), the communication devices 110 in subscriber domain 150-1 can initiate retrieval of content such as video on demand content, over-the-top content, broadcast content, IPTV content, webpage content, data packets, etc., on behalf of respective users 108.

Accordingly, wireless gateway 140 can be configured to provide different types of data services such as delivery of different types of content. In more particular embodiments discussed in more detail below, each user or corresponding communication device must be authenticated for the device to be allowed use of wireless gateway 140 to retrieve or transmit data over shared communication link 191.

Wireless gateway 140 can receive broadcast content from resources such as content delivery resource 113-1, content delivery resource 113-2, etc. The broadcast content can be transmitted over predetermined channels in shared network 190-3 to multiple subscriber domains 150. To play back broadcast content, the wireless gateway 140 can be configured to tune to one or more channels as indicated by users of communication devices 110-1.

In one embodiment, in addition to or as an alternative to conveying broadcast content, the shared communication link 191 can be configured to support distribution of so-called over-the-top content. For example, a portion of bandwidth in shared communication link 191 can be allocated to support data channels in accordance with DOCSIS (Data Over Cable Service Interface Specification) or any other suitable communication standard supporting bi-directional communications over shared communication link 191.

Each of the subscriber domains 150 can be assigned use of a portion of bandwidth in the data channels (of shared communication link 191) to communicate data in an upstream or downstream direction. Via use of the data channels, each of the users 108 in respective subscriber domains 150 can retrieve over-the-top content from respective server sources disposed in packet-switched network 190-1 such as the Internet. As its name suggests, packet-switched network 190-1 and/or other network such as core network 190-2 and shared network 190-3 enable routing of data packets based on network address information.

By way of a further non-limiting example, any of networks 190 can support client-server type communications. For example, subsequent to establishing communication link 128-1, communication device 110-1 operated by a respective user 108-1 can generate a request for retrieval of content from a particular server resource such as server resource 119 using an appropriate network address of the server resource 119. Assuming that the communication device 110 has already established a respective communication link 128-1 with wireless gateway 140, the communication device 110-1 transmits the request to wireless gateway 140. On behalf of the communication device 110-1, the wireless gateway 140 transmits the request for content over shared communication link 191 and packet-switched network 190-1 to server resource 119.

In response to receiving the request for content, the server resource 119 transmits the requested content over packet-switched network 190-1 (as over-the-top content) and shared communication link 191 to the wireless gateway 140. The wireless gateway 140 forwards the received content to communication device 110-1 in subscriber domain 150-1.

In a similar manner, each of the communication devices 110 in subscriber domain 150 can retrieve content via communications through the wireless gateway 140.

In one embodiment, core network 190-2 is or includes a cable network supporting services such as distribution of content via one or more cable television channels (e.g., QAM or quadrature amplitude modulated channels, IPTV channels, etc.) to subscriber domains in network environment 100.

As shown, shared network 190-3 (including shared communication link 191) supports final connectivity to subscribers or subscriber domains 150 and may include physical media such as one or more coaxial cables, optical fibers, twisted wire pairs, etc., to provide connectivity between distribution resource 125 and the subscriber domains 150.

Wireless gateway 140 includes communication portal 160 (such as one or more channels, cables, links, etc.) facilitating access to shared communication link 191.

More specific details of access control functionality provided by wireless gateway 140 are discussed below.

Figure 2:
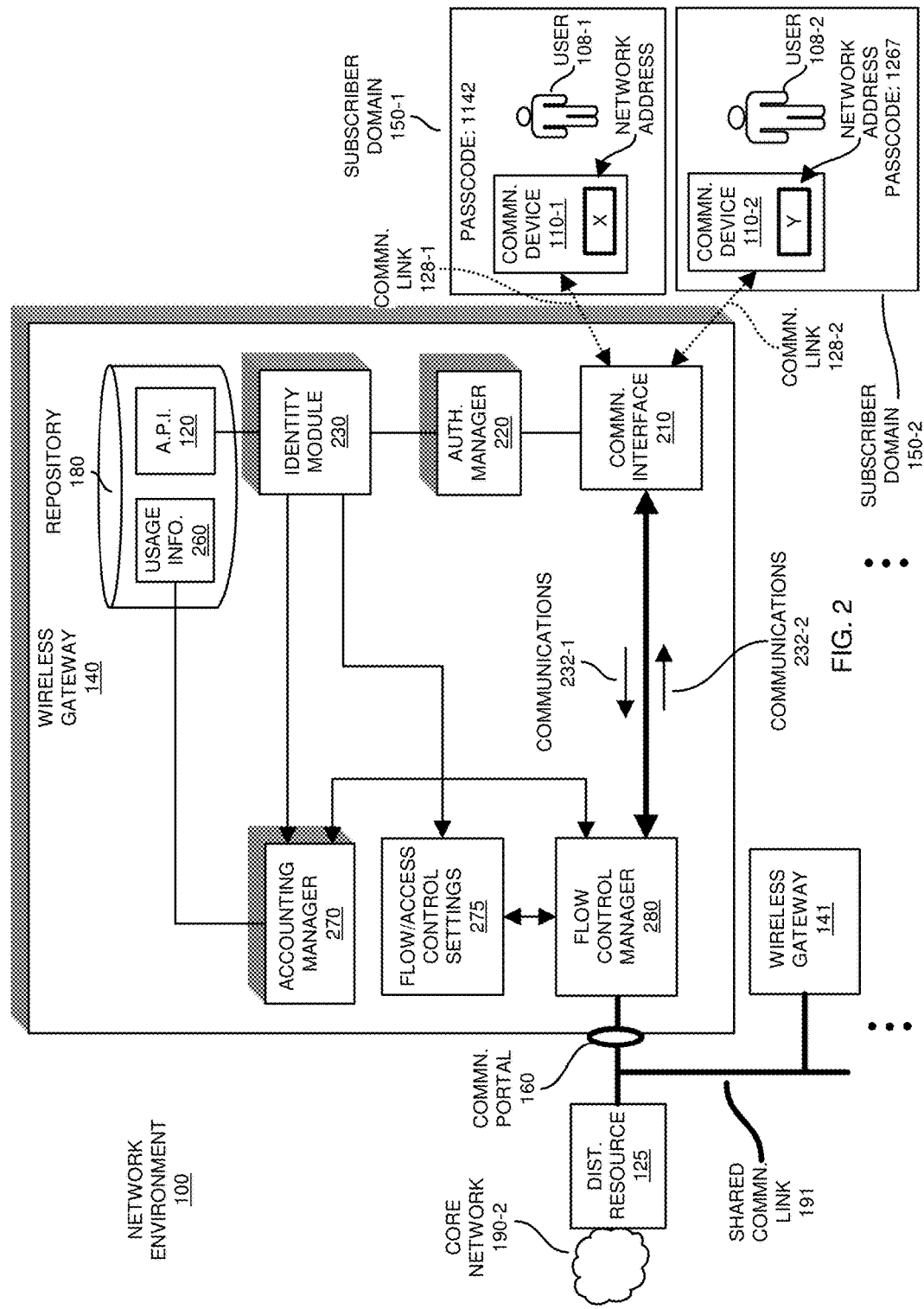
FIG. 2 is an example diagram illustrating a detailed view of a wireless gateway according to embodiments herein.

FIG. 2 is an example diagram illustrating a more detailed view of a wireless gateway according to embodiments herein.

In accordance with a more specific example embodiment, an entity or organization such as a business owner, homeowner, etc., controls a respective subscriber domain 150-1. The organization may be required to pay a subscription fee to a respective service provider for use of wireless gateway 140. The service provider controls access to use of shared communication link 191 and networks such as the Internet via input to wireless gateway 140.

As shown, the wireless gateway 140 couples to shared communication link 191 via communication portal 160. Via a respective wireless gateway 140 in each subscriber domain, the service provider and/or organization control access to shared communication link 191 amongst multiple subscribers and corresponding users.

Note that in addition to including a communication portal 160, the wireless gateway 140 can include communication interface 210 (such as an RF interface, hardwired interface, etc.) supporting communications with one or more communication devices in a respective subscriber domain.

In this example embodiment, the communication interface 210 supports connectivity with communication device 110-1 via communication link 128-1; communication interface 210-1 supports connectivity with communication device 110-2 via communication link 128-2; and so on.

During operation, the wireless gateway 140 facilitates connectivity between the one or more communication devices 110 and the shared communication link 191. In other words, one or more communication devices 110 can establish wireless connectivity such as via communication link 128-1, communication link 128-2, etc., with the wireless gateway 140. The wireless gateway 140 transmits communications 232-1 received from the one or more communication devices 110 through the communication portal 160 upstream on the shared communication link 191 to core network.

In an opposite direction, wireless gateway 140 can receive downstream communications from one or more remote resources in network 190 over the shared communication link 191 through the communication portal 160 to flow control manager 280. The flow control manager 280 of the wireless gateway 140 forwards the downstream communications 232-2 received through the communication portal 160 to corresponding one or more communication devices 110.

As an example of operation, assume that the wireless gateway 140 receives input from a user 108-1 operating a respective communication device 110-1 in subscriber domain 150-1 of network environment 100. In one embodiment, the user 108-1 provides the input to communicate through the communication portal 160 over the shared communication link 191.

The input received from the user 108-1 through communication device 110-1 can be any suitable value such as a unique identifier value (password, PIN, username, combination of username/password, etc.) indicating that the user of the communication device 110-1 or user 108-1 has been granted the authority to use the wireless gateway 140 to communicate over shared communication link 191 with one or more remote networks such as the Internet.

In this instance, assume that the user 108-1 of the communication device 110-1 receives the unique value such as passcode 1142 from an organization that manages the subscriber domain 150-1 in which the wireless gateway 140 resides. For example, an organization can provide the passcode 1142 to the user 108-1 at a time such as when the user 108-1 checks into a hotel, or when the user 108-1 purchases a corresponding product in a retail setting, etc.

In a similar manner, user 108-2 operating communication device 110-2 can receive passcode 1267 from the organization that manages subscriber domain 150-1 to access the remote network such as the Internet through wireless gateway 140.

As further discussed below, the different access codes distributed to corresponding users 108 in subscriber domain 150-1 may provide different levels of access to shared communication link 191 through the wireless gateway 140. As described herein, the unique value (e.g., passcode, promotion code, token, free access pass, etc.) received from the organization in control of subscriber domain 150-1 enables the corresponding users 108 to access the Internet through wireless gateway 140.

Assume in this instance that communication device 110-1 forwards passcode 1142 to communication interface 210. Prior to providing communication device 110-1 access to a remote network such as the Internet over shared communication link 191, the authentication manager 220 first forwards the unique value 1142 to identity module 230 in the wireless gateway 140.

Identity module 230, in turn, maps the received input (passcode 1142) to corresponding access profile information 120 stored in local repository 180 of the wireless gateway 140.

The corresponding access profile information 120 can be configured to indicate any suitable data flow control parameters. By way of non-limiting example, the corresponding access profile information 120 can specify (for the user 108-1 or holder of passcode 1142) data flow control parameters such as a maximum uplink bandwidth at which the user 108-1 is able to communicate data through the portal 160 to the shared communication link 191, a maximum downlink bandwidth in which the user 108-1 is able to receive data through the portal 160 from the shared communication link 191, the duration in which the corresponding user 108-1 is able to use the wireless gateway 140 to communicate over the shared communication link 191, an expiration date of the corresponding access profile information 120, etc.

As discussed in more detail below, accounting manager 270 and/or flow control manager 280 can be configured to keep track of usage information 260 associated with each of the users 108.

To provide communication device 110-1 access to shared communication link 191, the identity module 230 of the wireless gateway 140 retrieves the access profile information 120 and stores such information as flow control settings 275. In accordance with flow control settings 275 (access profile information 120), the flow control manager 280 controls communications to and from communication device 110-1 through wireless gateway 140 and communication portal 160.

Note that the wireless gateway 140 can be configured to control data flow in a similar manner for each user in subscriber domain 150-1 that supplies passcode 1142.

For users providing a different passcode such as passcode 1267, the flow control manager 280 uses different access profile information to control before data to corresponding users.

Note that wireless gateway 140 can be configured to encapsulate data packets such as received communications 232-1 prior to transmitting such data packets over shared communication link 191 upstream to distribution resource 125 (such as a cable modem termination system). In one embodiment, the flow control manager 280 (such as using cable modem functionality) wraps or encapsulates the data packets with delivery information facilitating a transfer of the data packets to distribution resource 125. The distribution resource 125 removes the delivery information and forwards the unwrapped data packets over core network 190-2 (a packet-switched network). The core network 190-2 facilitates distribution of the data packets to appropriate destination addresses.

In a reverse direction, the distribution resource 125 can be configured to encapsulate communications received from core network 190-2 and transmit encapsulated data packets to the wireless gateway 140. For example, the distribution resource 125 can receive a data packet addressed for delivery to communication device 110-1. The distribution resource 125 encapsulates the data packet with delivery information for delivery of the data packet to wireless gateway 140 and subsequently communication device 110-1. Flow control manager 280 receives the data packet and removes the delivery information and forwards the data packet downstream to communication interface 210 for delivery to communication device 110-1.

Figure 3:
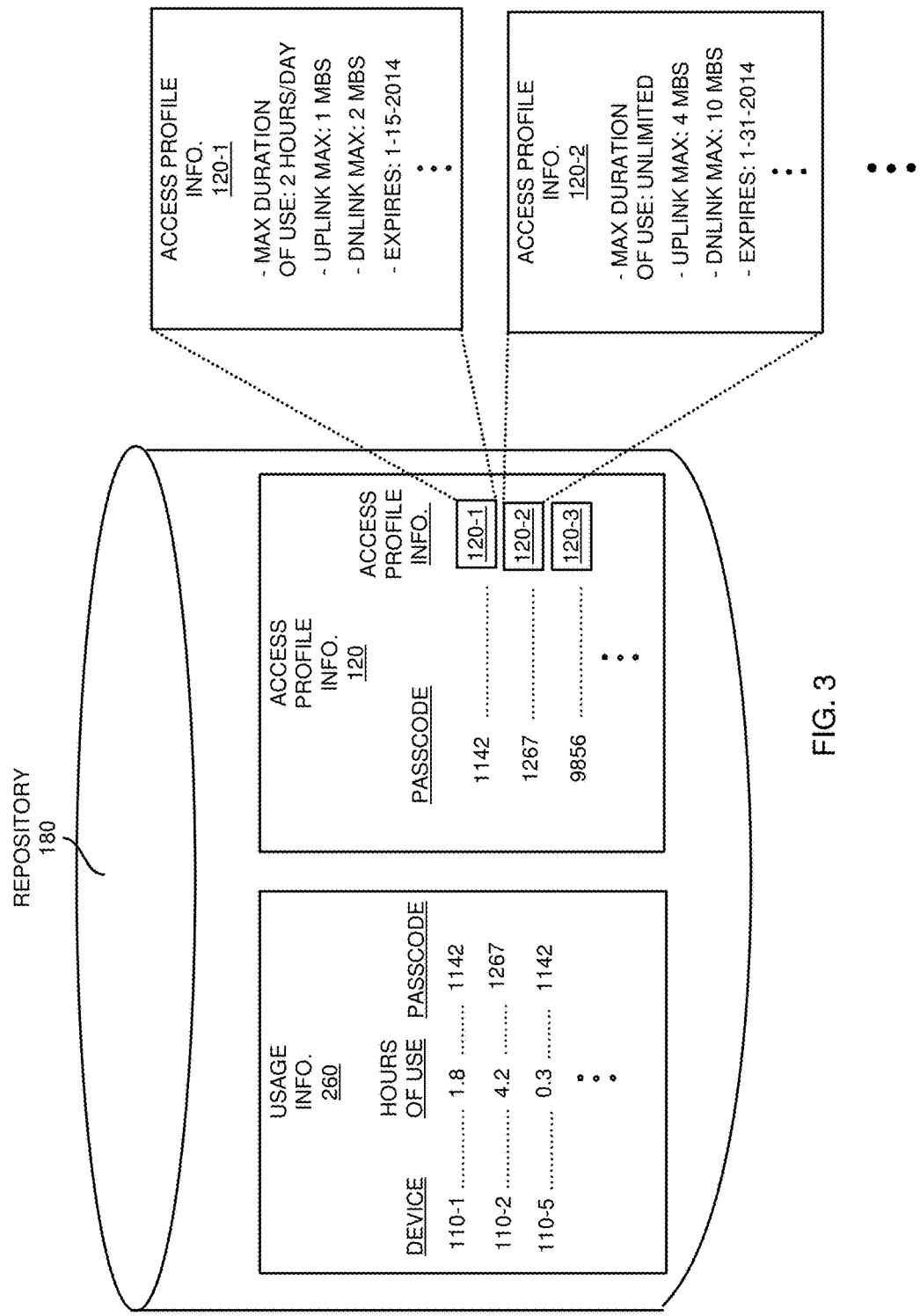
FIG. 3 is an example diagram illustrating generation and storage of access profile information and usage information according to embodiments herein.

FIG. 3 is an example diagram illustrating generation and storage of access profile information and usage information according to embodiments herein.

As previously discussed, repository 180 can be configured to store access profile information 120 and usage information 260. In this example embodiment, access profile information 120 includes access profile information 120-1, access profile information 120-2, access profile information 120-3, and so on.

The network administrator (acting on behalf of an organization associated with subscriber domain 150-1 as in FIG. 1) can produce respective access profile information to include different types of access flow control parameters. As shown, in this example embodiment, access profile information 120-1 indicates a maximum duration of use of wireless gateway 140 up to two hours per day by a respective user; access profile information 120-1 indicates a maximum uplink data speed of up to 1 megabyte per second by the respective user during communication session; access profile information 120-1 indicates the maximum downlink data speed of up to 2 megabytes per second by the respective user in a communication session; application profile information 120-1 indicates an expiration date of Jan. 15, 2014; and so on.

As further shown, the network administrator produces access profile information 120-2. Access profile information 120-2 indicates unlimited usage of wireless gateway 140 to access shared communication link 191; access profile information 120-2 indicates a maximum uplink data speed of 4 megabytes per second by the respective user; access profile information 120-2 indicates the maximum downlink data speed of 10 megabytes per second by the respective user; application profile information 120-2 indicates an expiration date of Jan. 31, 2014; and so on.

In one embodiment, the service provider indicates a predetermined total amount of available bandwidth (such as 100 megabytes per second on the uplink and 200 megabytes per second on the downlink) associated with communications through communication portal 160. The organization partitions the available bandwidth for use by multiple users via generation of access profile information 120. For example, access control information such as access profile information 120-1 allocates a first portion of the total available bandwidth for use by a first user; access control information such as access profile information 120-2 allocates a second portion of the total available bandwidth for use by a second user; and so on.

In addition to producing access profile information 120, the network administrator of subscriber domain also produces corresponding passcode information enabling different users 108 to use wireless gateway 140 to access shared communication link 191. By way of non-limiting example, the network administrator produces passcode information to include values such as 1142, 1267, 9856, etc. Network administrator initiates storage of the passcode information (unique identifier values) and corresponding mapping to corresponding access profile information 120 in the repository 180 of the wireless gateway 140.

As previously discussed, the network administrator of the subscriber organization initiates distribution of the passcode information to different users in subscriber domain 150-1.

In this example embodiment, the network administrator of subscriber domain 150-1 associates passcode 1142 to corresponding access profile information 120-1; the network administrator associates passcode 1267 to corresponding access profile information 120-2; the network administrator associates passcode 9856 to corresponding access profile information 120-3; and so on.

As discussed below in more detail, for a user that supplies passcode 1142 to wireless gateway 140 to access shared communication link 191, the corresponding wireless gateway 140 controls access to shared communication link 191 in a manner as specified by access profile information 120-1; for a user that supplies passcode 1267 to wireless gateway 140 to access shared communication link 191, the corresponding wireless gateway 140 controls access to shared communication link 191 in a manner as specified by access profile information 120-2; for a user that supplies passcode 9856 to wireless gateway 140 to access shared communication link 191, the corresponding wireless gateway 140 controls access to shared communication link 191 in a manner as specified by access profile information 120-3; and so on.

Further in this non-limiting example embodiment, one or more resources in the wireless gateway 140 can be configured to produce usage information 260 for storage in repository 180.

As its name suggests, usage information 260 includes any suitable information regarding past usage of wireless gateway 140 to access shared communication link 191 by each of multiple different users. In one embodiment, one or more resources such as flow control manager 280, accounting manager 270, etc., produce usage information 260 for storage in repository 180.

For further sake of illustration, usage information 260 in FIG. 3 indicates that an operator of communication device 110-1 has used passcode 1142 to access shared communication link 191 through wireless gateway 140 for a duration of 1.8 hours; usage information 260 indicates that an operator of communication device 110-2 has used passcode 1267 to access shared communication link 191 through wireless gateway 140 for a duration of 4.2 hours; usage information 260 indicates that an operator of communication device 110-5 has used passcode 1142 to access shared communication link 191 through wireless gateway 140 for a duration of 0.3 hours; and so on.

Referring again to FIG. 2, and as further discussed below, when controlling a flow of communications 232 through the communication portal 160 of the wireless gateway 140 to shared communication link 191, the flow control manager 280 in the wireless gateway 140 can be configured to retrieve the usage information 260 associated with a respective communication device (or user) requesting access to the shared communication link 191. In one embodiment, the flow control manager 280 restricts a flow of data from the communication device 110-1 through the communication portal 160 to the shared communication link 191 based at least in part on the obtained usage information 260 and/or the corresponding access control information (access profile information 120) assigned to the user or communication device.

In contrast to conventional techniques in which different types of information such as authentication information, usage information, access control information, etc., is stored at multiple disparate and remote locations in a respective network environment, a network administrator associated with a subscriber domain can produce and store such information locally in subscriber domain 150-1 such as in repository 180 of the wireless gateway 140. Because repository 180 resides within the wireless gateway 140, it is not necessary to communicate over shared communication link 191 (or other communication link) to retrieve usage information, access control information, etc., associated with the different users that use wireless gateway 140 to access shared communication link 191.

Figure 4:
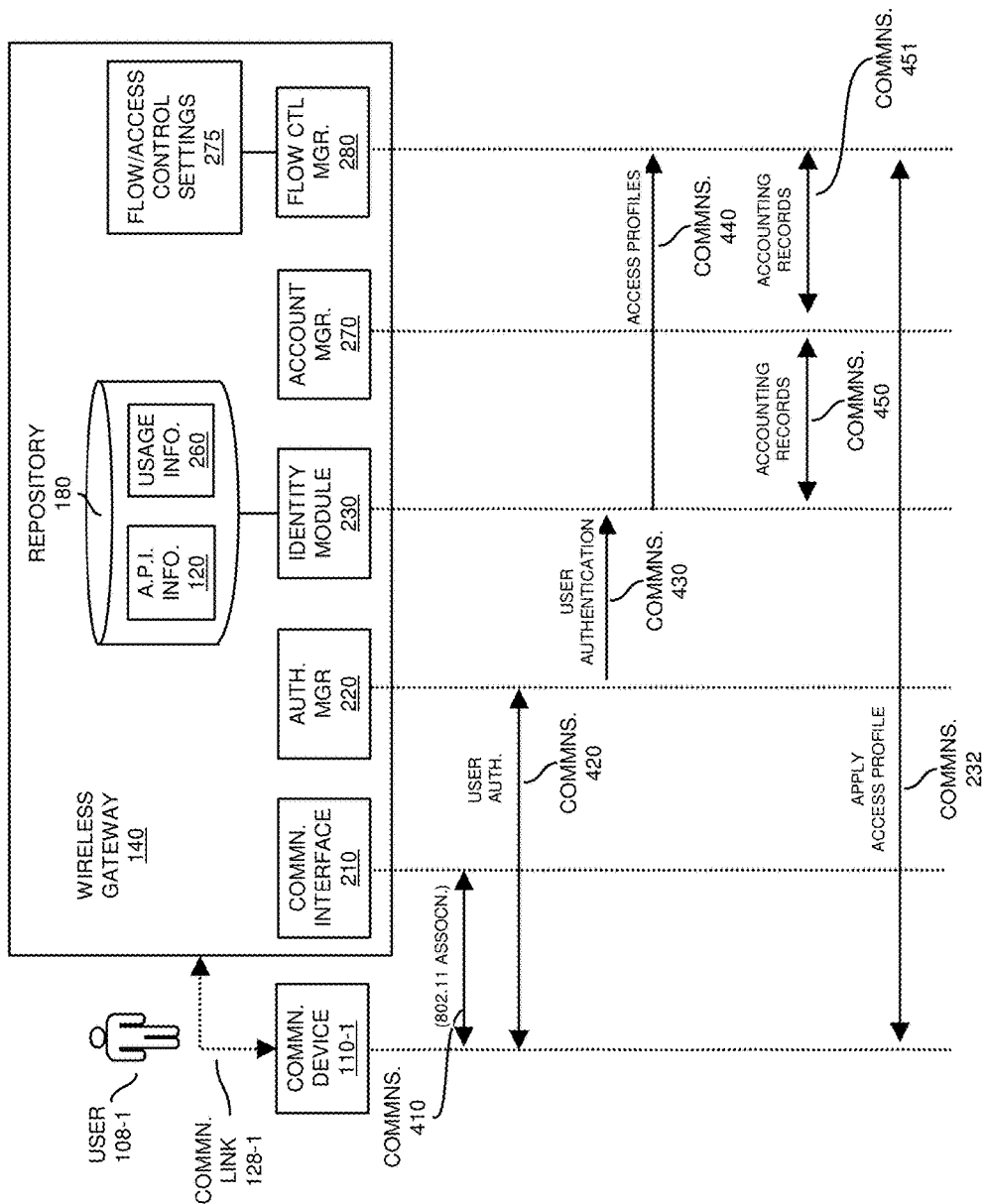
FIG. 4 is an example diagram illustrating communications in a wireless gateway facilitating network access management using one or more access profiles according to embodiments herein.

FIG. 4 is an example diagram illustrating communications in a wireless gateway facilitating network access management using one or more access profiles according to embodiments herein. Note that following illustrative discussion will occasionally refer back to details in FIGS. 1, 2, and 3.

As previously discussed, a respective organization distributes passcodes (such as passcode 1142, 1267, etc.) for use by respective users 108 in subscriber domain 150-1 to access shared communication link 191 through communication portal 160 of via wireless gateway 140.

Assume that the organization previously distributed passcode 1142 for use by user 108-1 to access shared communication link 191. Assume further that user 108-1 operates communication device 110-1 to communicate with communication interface 210 of wireless gateway 140.

Initially, via wireless communications 410 (such as WiFi™ communications) with communication interface 210, the communication device 110-1 establishes an association with communication interface 210 of wireless gateway 140 to create wireless communication link 128-1.

Subsequent to establishing communication link 128-1 and prior to allowing the communication device 110-1 access to shared communication link 191 through wireless gateway 140, via communications 420 from communication device 110-1 to authentication manager 220, the authentication manager 220 authenticates the user 108-1.

In one embodiment, the authentication manager 220 or other suitable resource prompts the user 108-1 of communication device 110-1 to provide appropriate credentials (such as a passcode, password, PIN, etc.) indicating that the corresponding user 108-1 and/or communication device 110-1 has been authorized to use services provided by wireless gateway 140 to access shared communication link 191. Prompting the user 108-1 or communication device 110-1 to provide the appropriate credentials can include causing a notification to be displayed on a display screen 130-1 of communication device 110-1. The notification notifies the user to provide the appropriate input such as a passcode for use of wireless gateway 140 to access shared communication link 191.

Assume in this example embodiment that, in response to the prompt, the user 108-1 transmits passcode 1142 over wireless communication link 128-1 to authentication manager 220.

Via further communications 430, the authentication manager 220 forwards the input received from communication device 110-1 (such as the passcode) to identity module 230. Identity module 230 identifies that the passcode 1142 (e.g., as previously inputted to repository 180 by the network administrator) is valid. The identity module 230 uses the passcode 1142 to map the received input (passcode 1142) to corresponding access profile information 120-1. This can be achieved via a table lookup, which associates passcodes with corresponding access profile information.

Subsequent to retrieving access profile information 120-1, the identity module 230, via communications 440, forwards the access profile information 120-1 to flow control manager 280. Flow control manager 280 stores the access profile information 120-1 as flow control settings 275 for communication device 110-1.

As previously discussed, the access profile information 120-1 can indicate to restrict usage of the wireless gateway 140 to access shared communication link 191 based at least in part on usage information 260. For example, as previously discussed, the access profile information 120-1 can include a parameter indicating maximum duration of usage (such as 2 hours for code 1142).

In this example embodiment, to enforce the 2-hour time limit of using wireless gateway 140, the identity module 230 retrieves accounting records (such as usage information) associated with communication device 110-1 from usage information 260. In this example, the identity module 230 retrieves usage information associated with communication device 110-1 and communicates such information (as accounting records) to accounting manager 270 via communications 450. In this example embodiment, the identity module 230 identifies that accounting records forwarded from identity module 230 to accounting manager 270 includes information indicating that communication device 110-1 has previously used passcode 1142 to access shared communication link 191 for 1.8 hours.

The accounting manager 270 makes the accounting records (retrieved usage information 260 associated with communication device 110-1) available to flow control manager 280. For example, via communications 451, the flow control manager 280 has access to usage information associated with communication device 110-1.

In one embodiment, the flow control manager 280 restricts a flow of data (communication 232) through communication portal 160 to shared communication link 191 based at least in part on the accounting records (indicating that the communication device 110-1 has used passcode 1142 for a current total of 1.8 hours to access use of shared communication link 191) and access profile information 120-1.

In one embodiment the flow control manager 280 provides feedback to accounting management 270 indicating how long the user 108-1 operates communication device 110-1 to access shared communication link 191 through communication portal 160 via the use of passcode 1142. The accounting manager 270 stores usage information in repository 180 as usage information 260.

Note again that, in this example embodiment, the access profile information 120-1 indicates that, for passcode 1142, the maximum usage of the wireless gateway 140 to access shared communication link 191 is 2 hours. Flow control manager 280 can be configured to continuously update the accounting records managed by accounting manager 270 to reflect total usage of wireless gateway 140 by user 108-1 to access shared communication link 191.

After an additional 0.2 hours, such as when the communication device 110-1 has used the wireless gateway 140 for the full two hours (such as via one or more different sessions), the accounting records managed by accounting manager 270 stores information indicating that user 108-1 has used the wireless gateway 140 for two hours. Because the access profile information 120-1 indicates that passcode 1142 can be used only for a duration of 2 hours per day, the flow control manager 280 terminates the ability of the communication device 110-1 to communicate through communication portal 160 to shared communication link 191.

Note that the operation of terminating usage can include can include providing notification to user 108-1 of communication device 110-1 that the maximum time limit of usage has been reached and that further access to shared communication link 191 via wireless gateway 140 has been terminated for this reason.

Accordingly, embodiments herein can include obtaining usage information associated with the communication device 110-1 and/or user 108-1. The usage information can be configured to track a past history of the communication device 110-1 (or user 108-1) using the wireless gateway 140 to communicate through the communication portal 160 to the shared communication link 191. The flow control manager 280 of wireless gateway 140 restricts a flow of communications through the communication portal 160 to the shared communication link 191 based at least in part on the obtained usage information (such as that user 108-1 has used the wireless gateway 140 to access shared communication link 191 for the maximum allotted time of two hours) and the corresponding access control information 120-1.

Assume that the organization distributes passcode 1267 for use by user 108-2. Assume further that user 108-2 operates communication device 110-2 to communicate with communication interface 210 of wireless gateway 140.

Initially, via wireless communications 410 (such as WiFi™ setup communications) with communication interface 210, the communication device 110-2 establishes an association with communication interface 210 of wireless gateway 140 to create wireless communication link 128-2.

Subsequent to establishing communication link 128-2 and prior to allowing the communication device 110-2 access to shared communication link 191 through wireless gateway 140, via communications 420 from communication device 110-2 to authentication manager 220, the authentication manager 220 authenticates the user 108-2 and/or communication device 110-2.

In one embodiment, via communications 420, the authentication manager 220 or other suitable resource prompts the user 108-2 of communication device 110-2 to provide appropriate credentials (such as a passcode, password, PIN, username, etc.) indicating that the corresponding user 108-2 and/or communication device 110-2 have been authorized to use services provided by wireless gateway 140 to access shared communication link 191. Prompting the user 108-2 or communication device 110-2 to provide the appropriate credentials can include causing a notification to be displayed on a display screen 130-2 of communication device 110-2. The notification notifies the user to provide the appropriate input such as a passcode for use of wireless gateway 140 to access shared communication link 191.

Assume in this example embodiment that, in response to the prompt, the user 108-2 transmits passcode 1267 over wireless communication link 128-2 to authentication manager 220.

Via further communications 430, the authentication manager 220 forwards the input received from communication device 110-2 (such as the passcode) to identity module 230. Identity module 230 identifies that the passcode 1267 (e.g., previously inputted to repository 180 by the network administrator) is valid. The identity module 230 uses the access profile information 120 to map the received input (passcode 1267) to corresponding access profile information 120-2. This can be achieved via a table lookup, which associates passcodes with corresponding access profile information.

Subsequent to retrieval access profile information 120-2, the identity module 230, in turn via communications 440, forwards the access profile information 120-2 to flow control manager 280. Flow control manager 280 stores the access profile information 120-2 as flow control settings 275 for communication device 110-2.

In this instance, access profile information 120-2 indicates that there is no limit of time for using passcode 1267 to access shared communication link 191. The flow control manager 280 restricts usage of the wireless gateway 140 by user 108-2 and communication device 110-2 in a manner as specified by access profile information 120-2 without use of usage information 260.

In accordance with yet further embodiments, note that the communications amongst resources (such as communication interface 210, authentication manager 220, identity module 230, account manager 270 flow control manager 280, etc.) can be supported by any suitable communication medium or media disposed in wireless gateway 140. For example, these different resources can be interconnected with each other via a network.

By way of a non-limiting example, each of these resources can be assigned a respective network address. To transmit communications, a respective source uses a destination address of a target resource to which the communication is transmitted. As an example, to forward communications from the communication interface 210 to authentication manager 220, the communication interface 210 generates one or more data packets including a network address of the authentication manager 220; the communication media in wireless gateway 140 facilitates delivery of the one or more data packets to authentication manager 220.

In contrast to conventional techniques that require encapsulation of data packets for transmission over a cable modem to data centers in a core network to perform authentication and other functions, embodiments herein include communicating within wireless gateway 140 via a communication medium such as a local network. Thus, encapsulation of data packets (using cable modem functionality) is not necessary. More specifically, according to embodiments herein, functions such as authentication, retrieval of past usage information 260, access profile information 120, etc., can be performed without encapsulating data packets since the data packets are transmitted locally in wireless gateway 140. That is, the packets are not transmitted over shared communication link 191. As previously discussed, in one embodiment, the flow control manager 280 can be configured to encapsulate communications 232 for transmission over a cable modem to a core network. Thus, communications received from and transmitted through shared communication link 191 may be encapsulated. However, communications conveyed within the wireless gateway 140 need not be encapsulated.

Figure 5:
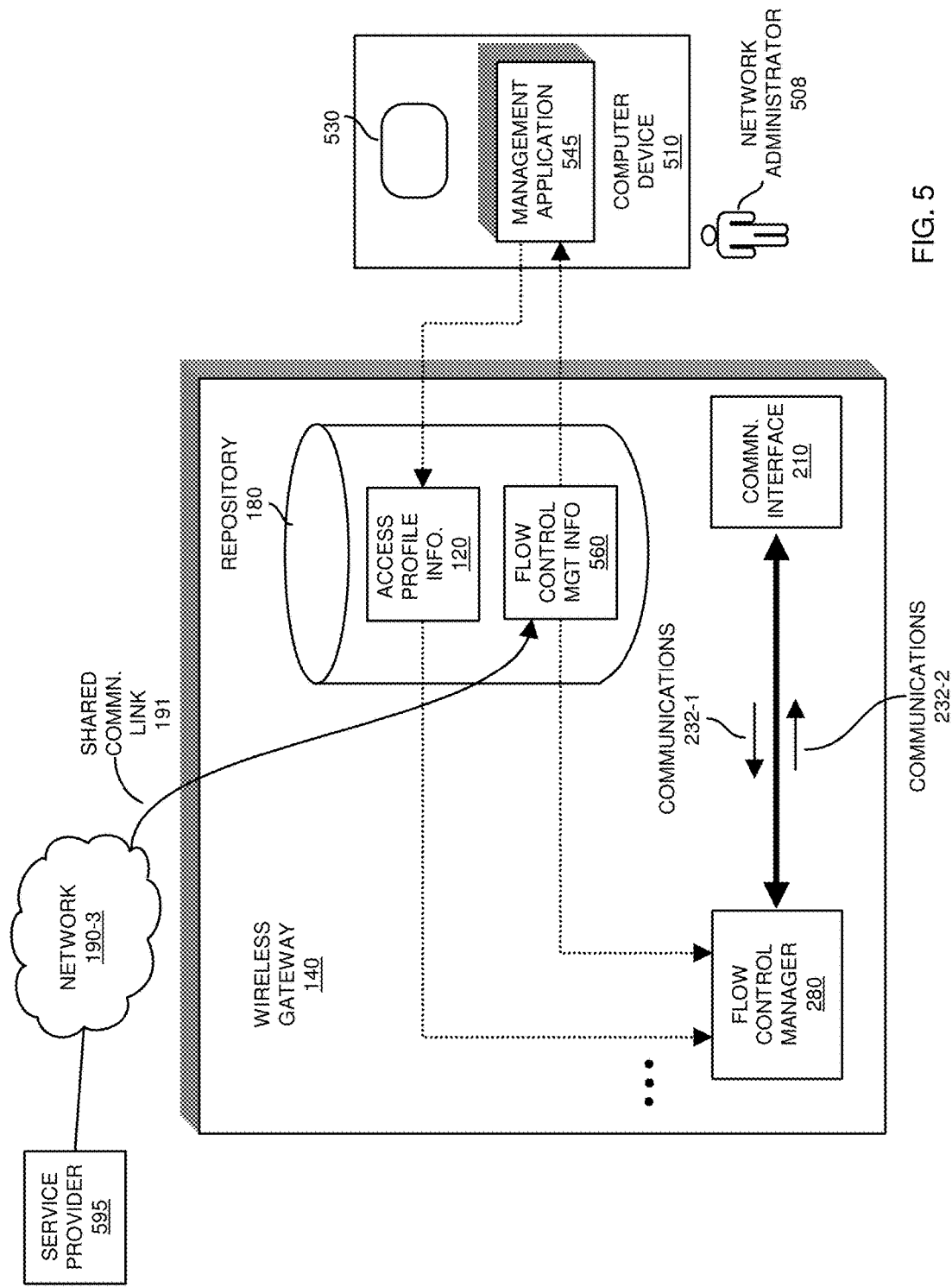
FIG. 5 is an example diagram illustrating local management of access control information in a wireless gateway according to embodiments herein.

FIG. 5 is an example diagram illustrating local management of access control information in a wireless gateway according to embodiments herein.

As previously discussed, a network administrator can control use of wireless gateway 140 amongst multiple users via generation of credentials (such as passcodes, passwords, etc.) and corresponding access profile information 120.

In accordance with further embodiments, note that the wireless gateway 140 can be configured to receive flow control management information 560 over a link such as shared communication link 191 from a service provider 595 that provides the wireless gateway 140. Via flow control management information 560, the service provider 595 is able to at least partially control operations of wireless gateway 140 such as reception and transmission of communications through communication portal 160.

The flow control management information 560 received by service provider 595 can specify settings for any suitable flow control parameters. In one embodiment, the flow control management information 560 specifies an aggregate bandwidth available for use by the wireless gateway 140 to communicate through the communication portal 160. Additionally or alternatively, flow control management information 560 can indicate parameters such as a maximum amount of bandwidth that each of the users 108 in subscriber domain 150-1 are able to transmit or receive data through wireless gateway 140 to shared communication link 191.

Upon receiving flow control management information 560, the wireless gateway initiates storage of the flow control management information 560 in repository 180.

Network administrator 508 (such as a user employed by an organization that controls usage of the wireless gateway 140 in subscriber domain 150-1) uses management application 545 executing on corresponding computer device 510 to manage access profile information 120 in a manner as previously discussed. Via management application 545, the wireless gateway 140 receives the corresponding access control information such as access profile information 120 from network administrator 508. As mentioned, the organization may pay a subscription fee to the service provider 595 for use of the bandwidth as indicated by flow control management information 560.

In addition to or as an alternative to the flow control management information 560 being used to control settings in access profile information 120, note that the flow control management information 560 can be used as an extra parameter to control flow of communications through wireless gateway 140. For example, the flow control manager 280 can be configured to receive the flow control management information 560 as generated by service provider 595. Flow control manager 280 controls flow of communications in accordance with the flow control management information 560. That is, the flow control management information 560 can specify a maximum overall bandwidth of data communications 232-1 or communications 232-2 through the wireless gateway 140. Flow control manager 280 of wireless gateway 140 limits overall communications 232 as specified by flow control management information 560. Additionally, in a manner as previously discussed, the flow control manager 280 uses corresponding access profile information 120 to control individual use of bandwidth by each of the respective communication devices 110. Thus, wireless gateway 140 can be configured to control flows of data based on a combination of control information produced by network administrator 508 as well as control information (flow control management information 560) as received from service provider 595.

More specifically, assume that the flow control management information 560 indicates the maximum bandwidth in which the wireless gateway 140 is able to transmit communications upstream through communication portal 160 over shared communication link 191. Also, assume that multiple users and corresponding communication devices in subscriber domain 150-1, in combination, attempt to communicate 250 megabytes per second in an upstream direction through communication portal 160 to shared communication link 191 at a particular time. In such an instance, and in accordance with the received flow control management information 560, the flow control manager 280 prevents upstream communications through communication portal 160 to shared communication link 191 to the specified maximum of 200 megabytes per second.

Figure 6:
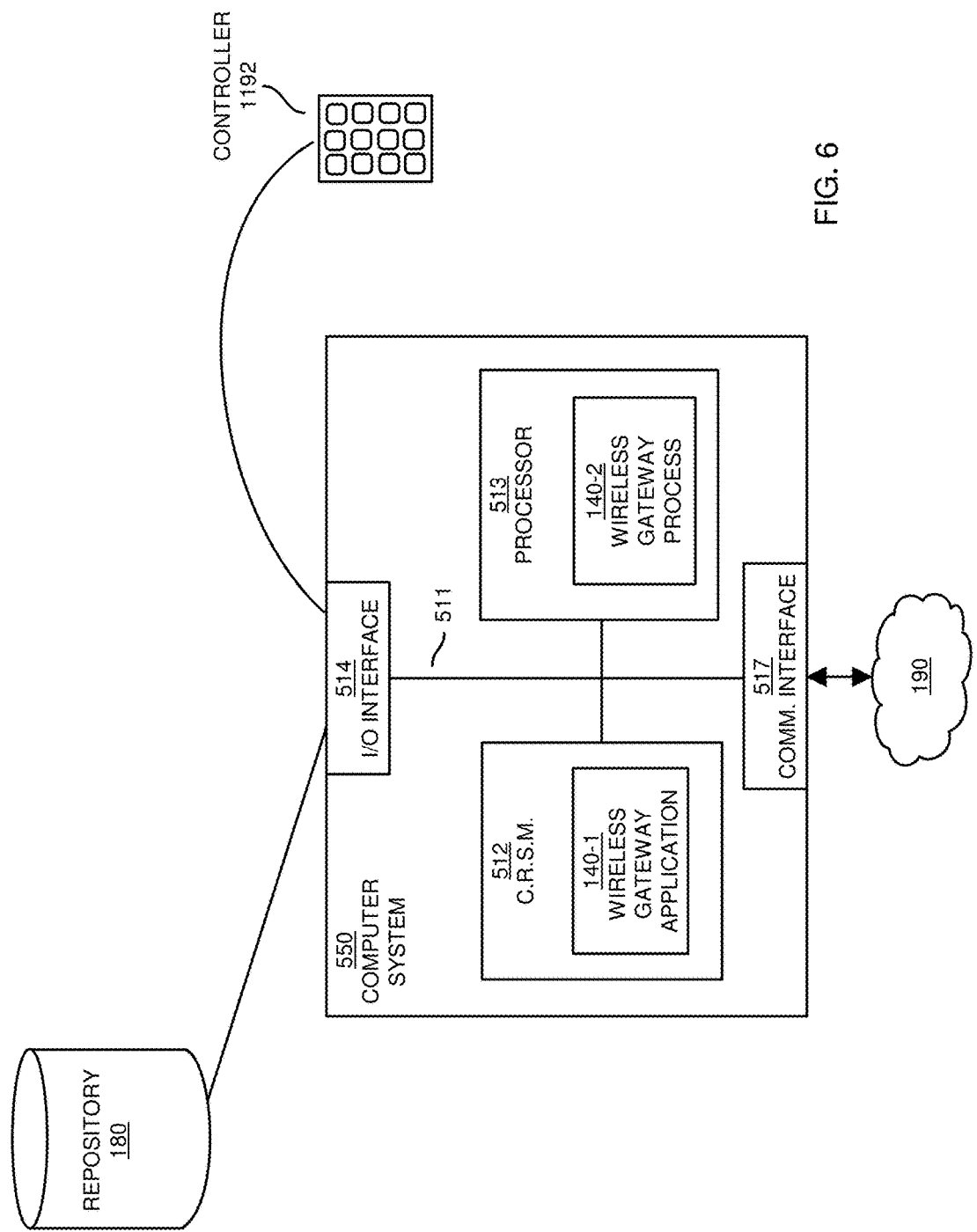
FIG. 6 is a diagram illustrating an example computer architecture in which to execute any of the functionality according to embodiments herein.

FIG. 6 is a diagram illustrating an example computer architecture in which to execute any of the functionality according to embodiments herein. Any of the different processing techniques can be implemented via execution of software code on computer processor hardware.

For example, as shown, computer system 550 (e.g., computer processor hardware) of the present example can include an interconnect 511 that couples computer readable storage media 512 such as a non-transitory type of media (i.e., any type of hardware storage medium) in which digital information can be stored and retrieved. The computer system 550 can further include processor 513 (i.e., computer processor hardware such as one or more processor co-located or disparately located processor devices), I/O interface 514, communications interface 517, etc.

Computer processor hardware (i.e., processor 513) can be located in a single location (such as in wireless gateway 140) or can be distributed amongst multiple locations.

As its name suggests, I/O interface 514 provides connectivity to resources such as repository 180, control devices (such as controller 1192), one or more display screens, etc.

Computer readable storage medium 512 can be any hardware storage device to store data such as memory, optical storage, hard drive, floppy disk, etc. In one embodiment, the computer readable storage medium 512 stores instructions and/or data.

Communications interface 517 enables the computer system 550 and processor resource 513 to communicate over a resource such as any of networks 190. I/O interface 514 enables processor resource 513 to access data from a local or remote location, control a respective display screen, receive input, etc.

As shown, computer readable storage media 512 can be encoded with wireless gateway application 140-1 (e.g., software, firmware, etc.) executed by processor 513. Wireless gateway application 140-1 can be configured to include instructions to implement any of the operations as discussed herein.

During operation of one embodiment, processor 513 accesses computer readable storage media 512 via the use of interconnect 511 in order to launch, run, execute, interpret or otherwise perform the instructions in wireless gateway application 140-1 stored on computer readable storage medium 512.

Execution of the wireless gateway application 140-1 produces processing functionality such as wireless gateway process 140-2 in processor resource 513. In other words, the wireless gateway process 140-2 associated with processor resource 513 represents one or more aspects of executing wireless gateway application 140-1 within or upon the processor resource 513 in the computer system 550.

Those skilled in the art will understand that the computer system 550 can include other processes and/or software and hardware components, such as an operating system that controls allocation and use of hardware resources to execute wireless gateway application 140-1.

In accordance with different embodiments, note that computer system may be any of various types of devices, including, but not limited to, a set-top box, access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, etc., or in general any type of computing or electronic device.

The computer system 550 may reside at any location or multiple locations in network environment 100. The computer system 550 can be included in any suitable resource in network environment 100 to implement functionality as discussed herein.

Note that each of the other functions as discussed herein can be executed in a respective computer system based on execution of corresponding instructions.

Figure 7:
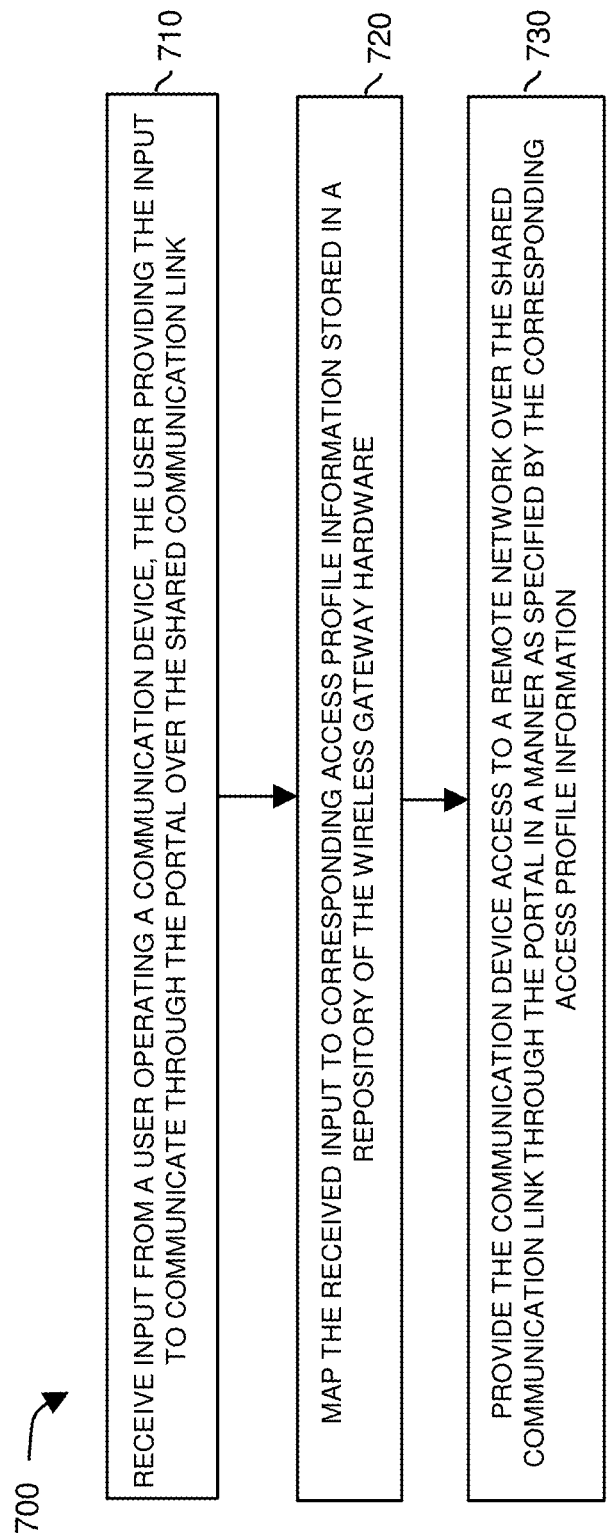
FIG. 7 is an example diagram illustrating a method of controlling network access according to embodiments herein.

FIG. 7 is a flowchart 700 illustrating an example method according to embodiments. Note that there will be some overlap with respect to concepts as discussed above. Note further that the processing in the flowcharts below can be executed in any suitable order. In one embodiment, the wireless gateway 140 represents wireless gateway hardware that controls access through communication portal 160 to shared communication link 191 via performing the following operations.

In processing block 710, the wireless gateway 140 receives input from a user 108-1 operating communication device 110-1 in subscriber domain 150-1. The user 108-1 provides the input (such as a passcode, password, unique value, etc.) to communicate through the portal 160 over the shared communication link 191.

In processing block 720, the wireless gateway 140 maps the received input to corresponding access profile information 120-1 stored in repository 180 of the wireless gateway 140.

In processing block 730, the wireless gateway 140 provides the communication device 110-1 access to a remote network (such as network 190-3, network 190-2, network 190-1, etc.) over the shared communication link 191 through the communication portal 160 in a manner as specified by the corresponding access profile information 120-1.

Note again that techniques herein are well suited for enabling an organization to provide and control network access amongst multiple users in a subscriber domain. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:
1. A method comprising:
receiving a first usage code, the first usage code received from a first communication device;
receiving a second usage code, the second usage code received from a second communication device, the second usage code different than the first usage code; and
providing the first communication device and the second communication device access through a wireless gateway resource to a remote network in a manner as specified by corresponding access profile information assigned to the first usage code and the second usage code, the second communication device being provided with limited access through the wireless gateway resource to the remote network depending on tracked use of the second usage code by the second communication device to access the remote network; and
the method further comprising: individually tracking multiple communication devices operated by respective users assigned use of the first usage code to access the remote network through the wireless gateway resource.

2. The method as in claim 1, wherein the first usage code is distributed to a first user operating the first communication device to communicate through the wireless gateway resource and over a shared communication link to the remote network; and
wherein the second usage code is distributed to a second user operating the second communication device to communicate through the wireless gateway resource and over the shared communication link to the remote network.

3. The method as in claim 2, wherein the first usage code and the second usage code are assigned by a subscriber entity that subscribes to use of bandwidth in the shared communication link, the subscriber entity providing the first usage code to the first user and the second usage code to the second user for access to the remote network through the wireless gateway resource.

4. The method as in claim 3, wherein the first usage code provides the first user operating the first communication device access to the remote network through the wireless gateway resource in accordance with first access profile information; and wherein the second usage code provides the second user operating the second communication device access to the remote network through the wireless gateway resource in accordance with second access profile information.

5. The method as in claim 4, wherein providing each of the first communication device and the second communication device access through the wireless gateway resource includes:

in response to receiving the first usage code from the first communication device, mapping the first usage code to the first access profile information;

providing the first communication device access to the remote network over the shared communication link through the wireless gateway resource in a manner as specified by the first access profile information;

in response to receiving the second usage code from the second communication device, mapping the second usage code to the second access profile information; and providing the second communication device access to the remote network over the shared communication link through the wireless gateway resource in a manner as specified by the second access profile information.

6. The method as in claim 1 further comprising:

tracking historical usage of the first communication device accessing the remote network through the wireless gateway resource via use of the first usage code;

limiting the first communication device access to the remote network as indicated by first access profile information assigned to the first usage code;

tracking historical usage of the second communication device accessing the remote network through the wireless gateway resource via use of the second usage code; and limiting the second communication device access to the remote network as indicated by second access profile information assigned to the second usage code.

7. The method as in claim 6, wherein the first usage code is assigned by a subscriber entity that subscribes to use of bandwidth in a shared communication link between the wireless gateway resource and the remote network, the subscriber entity assigning the first usage code to the first user and the second usage code to the second user for access to the remote network through the wireless gateway resource.

8. The method as in claim 1, wherein a subscriber entity produces the first usage code and the second usage code for distribution, the subscriber entity subscribing to network access services provided by a service provider that provides the subscriber entity use of the wireless gateway resource and a shared communication link to access the remote network.

9. The method as in claim 1 further comprising:

prior to receiving the first usage code from the first communication device, establishing a wireless communication link between the wireless gateway resource and the first communication device; and receiving the first usage code over the established wireless communication link from the first communication device, the first usage code conveyed over the wireless communication link to the wireless gateway resource in response to the wireless gateway resource prompting the user to provide a usage code to access the remote network.

10. The method as in claim 1 further comprising:

receiving flow control management information over a shared communication link from a service provider that i) provides the wireless gateway resource and ii) controls usage of the shared communication link; and the flow control management information specifying bandwidth available for use by the wireless gateway resource.

11. The method as in claim 1, wherein the second usage code is assigned for use by the second communication device and a third communication device.

12. The method as in claim 11 further comprising:

tracking a first amount of time in which the second communication device uses the second code to access the remote network through the wireless gateway resource; and tracking a second amount of time in which the third communication device uses the second code to access the remote network through the wireless gateway resource, the second amount of time different than the first amount of time.

13. The method as in claim 11, wherein the access profile information includes first access profile information and second access profile information, the first access profile information assigned to the first usage code, the second access profile information assigned to the second usage code;

wherein the first access profile information indicates access control assigned to the first user using the first code; and wherein the second access profile information indicates access control assigned to the second user and the third user using the second code.

14. The method as in claim 1, wherein the tracked use of the second usage code is an amount of time in which the second communication device uses the second usage code to access the remote network through the wireless gateway resource.

15. The method as in claim 14, wherein the second usage code is assigned for use by the second communication device and a third communication device.

16. An apparatus comprising:

wireless gateway hardware in communication with a remote network, the wireless gateway hardware operable to:

receive a first usage code, the first usage code received from a first communication device;

receive a second usage code, the second usage code received from a second communication device, the second usage code different than the first usage code, the second usage code assigned for use by the second communication device and a third communication device; and provide the first communication device and the second communication device access through a wireless gateway resource to a remote network in a manner as specified by corresponding access profile information assigned to the first usage code and the second usage code, the second communication device being provided with limited access through the wireless gateway resource to the remote network depending on tracked use of the second usage code by the second communication device to access the remote network; and individually track multiple communication devices operated by respective users assigned use of the first usage code to access the remote network through the wireless gateway resource.

17. The apparatus as in claim 16, wherein the first usage code is distributed to a first user operating the first communication device to communicate through the wireless gateway resource and over a shared communication link to the remote network; and wherein the second usage code is distributed to a second user operating the second communication device to communicate through the wireless gateway resource and over the shared communication link to the remote network.

18. The apparatus as in claim 17, wherein the first usage code and the second usage code are assigned by a subscriber entity that subscribes to use of bandwidth in the shared communication link, the subscriber entity providing the first usage code to the first user and the second usage code to the second user for access to the remote network through the wireless gateway resource.

19. The apparatus as in claim 18, wherein the first usage code provides the first user operating the first communication device access to the remote network through the wireless gateway resource in accordance with first access profile information; and wherein the second usage code provides the second user operating the second communication device access to the remote network through the wireless gateway resource in accordance with second access profile information.

20. The apparatus as in claim 19, wherein the wireless gateway hardware is further operable to:

in response to receiving the first usage code from the first communication device, map the first usage code to the first access profile information;

provide the first communication device access to the remote network over the shared communication link through the wireless gateway resource in a manner as specified by the first access profile information;

in response to receiving the second usage code from the second communication device, map the second usage code to the second access profile information; and provide the second communication device access to the remote network over the shared communication link through the wireless gateway resource in a manner as specified by the second access profile information.

21. The apparatus as in claim 16, wherein the wireless gateway hardware is further operable to:

track historical usage of the first communication device accessing the remote network through the wireless gateway resource via use of the first usage code;

limit the first communication device access to the remote network as indicated by first access profile information assigned to the first usage code;

track historical usage of the second communication device accessing the remote network through the wireless gateway resource via use of the second usage code; and limit the second communication device access to the remote network as indicated by second access profile information assigned to the second usage code.

22. The apparatus as in claim 21, wherein the first usage code is assigned by a subscriber entity that subscribes to use of bandwidth in a shared communication link between the wireless gateway resource and the remote network, the subscriber entity assigning the first usage code to the first user and the second usage code to the second user for access to the remote network through the wireless gateway resource.

23. The method as in claim 16, wherein a subscriber entity produces the first usage code and the second usage code for distribution, the subscriber entity subscribing to network access services provided by a service provider that provides the subscriber entity use of the wireless gateway resource and a shared communication link to access the remote network.

24. The apparatus as in claim 16, wherein the wireless gateway hardware is further operable to:

prior to receiving the first usage code from the first communication device, establish a wireless communication link between the wireless gateway resource and the first communication device; and receive the first usage code over the established wireless communication link from the first communication device operated, the first usage code conveyed over the wireless communication link to the wireless gateway resource in response to the wireless gateway resource prompting the user to provide a usage code to access the remote network.

25. Computer-readable hardware storage having instructions stored thereon, the instructions, when executed by computer processor hardware, causing the computer processor hardware to:

receive a first usage code, the first usage code received from a first communication device;

receive a second usage code, the second usage code received from a second communication device, the second usage code different than the first usage code; and provide the first communication device and the second communication device access through a wireless gateway resource to a remote network in a manner as specified by corresponding access profile information assigned to the first usage code and the second usage code, the second communication device being provided with limited access through the wireless gateway resource to the remote network depending on tracked use of the second usage code by the second communication device to access the remote network; and individually tracking multiple communication devices operated by respective users assigned use of the first usage code to access the remote network through the wireless gateway resource.

26. A method comprising:

receiving a first usage code, the first usage code received from a first communication device;

receiving a second usage code, the second usage code received from a second communication device, the second usage code different than the first usage code; and providing the first communication device and the second communication device access through a wireless gateway resource to a remote network in a manner as specified by corresponding access profile information assigned to the first usage code and the second usage code, the second communication device provided limited access through the wireless gateway resource to the remote network depending on tracked use of the second usage code by the second communication device to access the remote network;

tracking a first amount of time in which the second communication device uses the second code to access the remote network through the wireless gateway resource; and tracking a second amount of time in which the third communication device uses the second code to access the remote network through the wireless gateway resource, the second amount of time different than the first amount of time;

wherein the access profile information includes first access profile information and second access profile information, the first access profile information assigned to the first usage code, the second access profile information assigned to the second usage code;

wherein the first access profile information indicates access control assigned to the first user using the first code; and wherein the second access profile information indicates access control assigned to second user and the third user using the second code, the method further comprising:

controlling access by the second communication device through the wireless gateway resource to the remote network based on the tracked first amount of time with respect to a time value specified in the second access profile information;

and controlling access by the third communication device through the wireless gateway resource to the remote network based on the tracked second amount of time with respect to the time value specified in the second access profile information.

* * * * *